United States Patent [19]
Mandel

[11] 3,981,977
[45] Sept. 21, 1976

[54] METHOD OF PRODUCING DEUTERIUM-OXIDE-ENRICHED WATER

[75] Inventor: Heinrich Mandel, Essen, Germany

[73] Assignee: Rheinisch-Westfalisches-Elektrizitatswert Aktiengesellschaft, Essen, Germany

[22] Filed: Aug. 3, 1972

[21] Appl. No.: 277,662

Related U.S. Application Data

[63] Continuation-in-part of Ser. No. 223,038, Feb. 2, 1972, abandoned, which is a continuation of Ser. No. 865,384, Oct. 10, 1969, abandoned.

[30] Foreign Application Priority Data

Oct. 12, 1968 Germany.......................... 1802867

[52] U.S. Cl............................ 423/580; 23/270 R; 23/263
[51] Int. Cl.².......................................... C01B 5/02
[58] Field of Search............................ 423/580, 648

[56] References Cited
FOREIGN PATENTS OR APPLICATIONS 824,954    12/1959    United Kingdom................ 423/580
1,224,946   3/1971    United Kingdom................ 423/580

OTHER PUBLICATIONS
Selak et al., "Heavy Water, A Review of Processes & Plants for Large-Scale Production," Chemical Engineering Progress, vol. 50, No. 5, May 1954, pp. 221–229.

Primary Examiner—Earl C. Thomas
Attorney, Agent, or Firm—Karl F. Ross; Herbert Dubno

[57] ABSTRACT

A method of and an apparatus for producing deuterium-oxide-enriched water (e.g. as a source of deuterium-rich gas mixtures) are disclosed wherein the multiplicity of individual cooling cycles of a power plant are connected in replenishment cascade so that fresh feed water with a naturally occurring level of deuterium oxide is supplied to replace the vaporization losses, sludge losses and withdrawn portion of water in a first cooling cycle, the withdrawn water being fed as the feed water to the subsequent cooling cycle or stage and serving as the sole feed-water input to the latter. At the end of the replenishment-cascade system, the withdrawn water has a high concentration of deuterium oxide and may serve as a source of water for the production of heavy water or deuterium-enriched gas by conventional methods of removing deuterium oxide or deuterium from the deuterium-oxide-enriched water. Each cooling cycle may form part of a thermal or nuclear power plant in which a turbine is driven by part of the energy and air-cooling of the water takes place in the atmosphere, e.g. in a cooling tower.

3 Claims, 4 Drawing Figures

METHOD OF PRODUCING DEUTERIUM-OXIDE-ENRICHED WATER

CROSS-REFERENCE TO RELATED APPLICATIONS

This application is a continuation-in-part of my copending application Ser. No. 223,038 filed Feb. 2, 1972 and entitled PROCESS FOR THE RECOVERY OF HEAVY WATER. That application, now abandoned, was a continuation of application Ser. No. 865,384 filed Oct. 10, 1969 and entitled APPARATUS FOR PRODUCING HEAVY WATER OR DEUTERIUM-RICH GAS MIXTURES, now also abandoned.

FIELD OF THE INVENTION

My present invention relates to a method of producing deuterium-oxide-enriched water and, more particularly, of raising the deuterium-oxide content of water to improve the economy of heavy-water production.

BACKGROUND OF THE INVENTION

Natural water, represented by the chemical formula $H_2O$, normally contains a proportion of deuterium oxide HDO or $D_2O$ in amounts which may be as low as, say, 143 parts per million. It is known that deuterium oxide, or so-called heavy water, is useful for many purposes particularly in the nuclear-reactor field where it forms a primary coolant or a reaction moderator and is required in large quantities for heavy-water nuclear reactors.

In the production of heavy water or in the recovery of deuterium, it is known to enrich naturally occurring water in order to improve the economy of any extraction process. As pointed out in my earlier applications mentioned above, it has already been proposed for the production of heavy water to utilize techniques which occur naturally in augmenting the deuterium-oxide concentration in natural water. In fact, naturally occurring water derived from large bodies, such as oceans, seas and lakes, which undergo a constant process of concentration as a consequence of evaporation, are well known as advantageous sources of deuterium oxide because the concentration therein is higher than the concentration of water in other sources which do not undergo evaporation as readily.

While it is desirable to make use of water having the highest natural concentration of deuterium oxide as a source of water for processes by which deuterium oxide can be recovered or deuterium can be removed from water, difficulties are encountered with the use of water from the larger naturally occurring bodies. For example, sea water is not an effective source because the high salt content introduces difficulties in operation and, because of scaling, requires equipment designed to resist corrosion and having a capacity for scale removal etc. If a prior salt-removal step is used to render the water more desirable for deuterium-oxide recovery, considerable expense is involved.

It has also been proposed to enrich water with deuterium oxide and tritium oxide by drawing upon chemical systems which use water in the process. For example, a so-called "parasitic" enrichment process has been suggested in which a predetermined quantity of water necessary for or used in another chemical process is employed as a source of water. The deuterium-oxide content is thereby increased by an isotope-exchange reaction between the hydrogen of the water and deuterium elsewhere in the chemical system. These processes are, however, limited by the amount of water which can be obtained from such chemical processes, a quantity which is relatively small, and by the limited amount of deuterium which will exchange for hydrogen under the conditions customary in such systems.

It should also be noted that a process of enrichment of the deuterium concentration occurs naturally in conventional electric-power-generating plants utilizing a cooling circuit in conjunction with the primary steam circuit. In such electric-power-generating systems, the heat from a boiler operated by combustible or fissionable fuels may convert water to steam (generally superheated) which is introduced under pressure to a steam turbine mechanically coupled to an electric generator. The expansion of steam in the turbine drives the rotor of the latter and, consequently, the generator. The depleted steam is then passed through the condenser in indirect heat exchange with the secondary coolant, i.e. water. The circulation path of the latter includes a pump and a cooling tower open to the atmosphere. Since a portion of the secondary cooling water is continuously evaporated into the atmosphere, a concentration of deuterium oxide occurs naturally in this secondary cooling in this secondary cooling circuit, albeit at a low rate. The condensate (primary liquid) is returned to the heat source while evaporation losses are compensated by make-up water generally containing only the deuterium-oxide concentration of natural water.

OBJECTS OF THE INVENTION

The general object of my invention, therefore, is to provide an improved method of increasing the concentration of heavy water in natural water.

A more particular object is to utilize the facilities of conventional power plants, including steam turbines, for this purpose.

SUMMARY OF THE INVENTION

I have found, in accordance with this invention, that a substantial increase in the proportion of heavy water over that naturally occurring can be achieved by circulating respective volumes of water in a multiplicity of treatment stages following one another in a predetermined order, heating the water in each stage to an elevated temperature, cooling the heated water in each stage to approximately ambient temperature by exposure to the open air, with evaporation of a fraction of the circulating quantity, and transferring a portion of the cooled water of any preceding stage to the immediately following stage at a rate exceeding the combined evaporation losses of all succeeding stages whereby the circulating water is progressively enriched, from one stage to the next, in its heavy-water content. Fresh water is supplied to the first stage at a rate balancing the evaporation losses of that stage and the portion of water transferred therefrom to the second stage so that part of the cooled water of the last stage, with an increased concentration of heavy water, can be withdrawn therefrom at a rate representing an excess of the supply rate over the evaporation rate.

In order to achieve a high degree of enrichment, as will be shown below, it is desirable to withdraw the water from the last stage at a rate which is substantially smaller than the evaporation rate thereof. Advantageously, this evaporation rate is about the same for each stage, as will be apparent from the specific Example given hereinafter, owing to the fact that the volumes of circulating water are substantially equal in all stages.

More specifically, the various treatment stages referred to can be cascaded cooling circuits of respective power plants wherein the water is heated in a condenser for spent steam from a turbine and is then brought back to approximately ambient temperature in an open-air cooling tower.

It will be understood that, for the purposes of the present invention, an "open" cooling-water-circulation system is one which communicates with the atmosphere at one or more points, preferably cooling towers, so that a portion of the cooling water circulated at each traverse of the system is evaporated by heat exchange with another medium. In such open cooling towers, the circulation system generally provides for the passage of liquid water over plates or the like having a high effective surface area in contact with atmospheric air which may be induced to flow through the cooling tower by fans (forced draft) or by convection (natural draft). When the relative humidity of the air in contact with the water or traversing the cooling tower is less than 100%, a portion of the water evaporates, the latent heat of evaporation being removed from the water to cool the latter. In most cooling towers, this and any other loss, occurring when sludge water is withdrawn from the tower, is replenished by fresh feed water.

In a system of $n$ stages, operating with identical evaporation losses $v$, water must be extracted from any stage except the last one at a rate $a_i$ compensating for the extraction rate $_{i+1}$ and the evaporation rate of the next-following stage whence $a_i = a_{i+1} + v$.

If the extracted water is highly laden with solids so that the effluent becomes a sludge, the liquid may be separated from the sludge by decantation or filtration. In such a case, of course, the water lost in the sludge must be taken into consideration in determining the make-up rate at each stage. The extraction rate $a_n$ of the final stage, possibly reduced by a proportion of unusable water retained in a sludge, represents the rate of recovery $w$ of useful isotope-enriched water from the system.

The normal deuterium-oxide content of water, expressed in terms of HDO, is, on the average, about 0.0143% or about 143 parts per million in water which has not been enriched by any of the techniques described above. $H_2O$ has a higher partial pressure, at temperatures in the ordinary range (say 4°C to 40°C), than HDO and the partial-pressure ratio $P_p$ of $H_2O$ to HDO at 28°C is about 1.07. Thus $H_2O$ evaporates at a rate which exceeds by more than 14% the rate of evaporation of deuterium oxide from natural water.

BRIEF DESCRIPTION OF THE DRAWING

The above and other objects, features, and advantages of the present invention will become more readily apparent from the following description, reference being made to the accompanying drawing in which.

SPECIFIC DESCRIPTION

Figure 1:
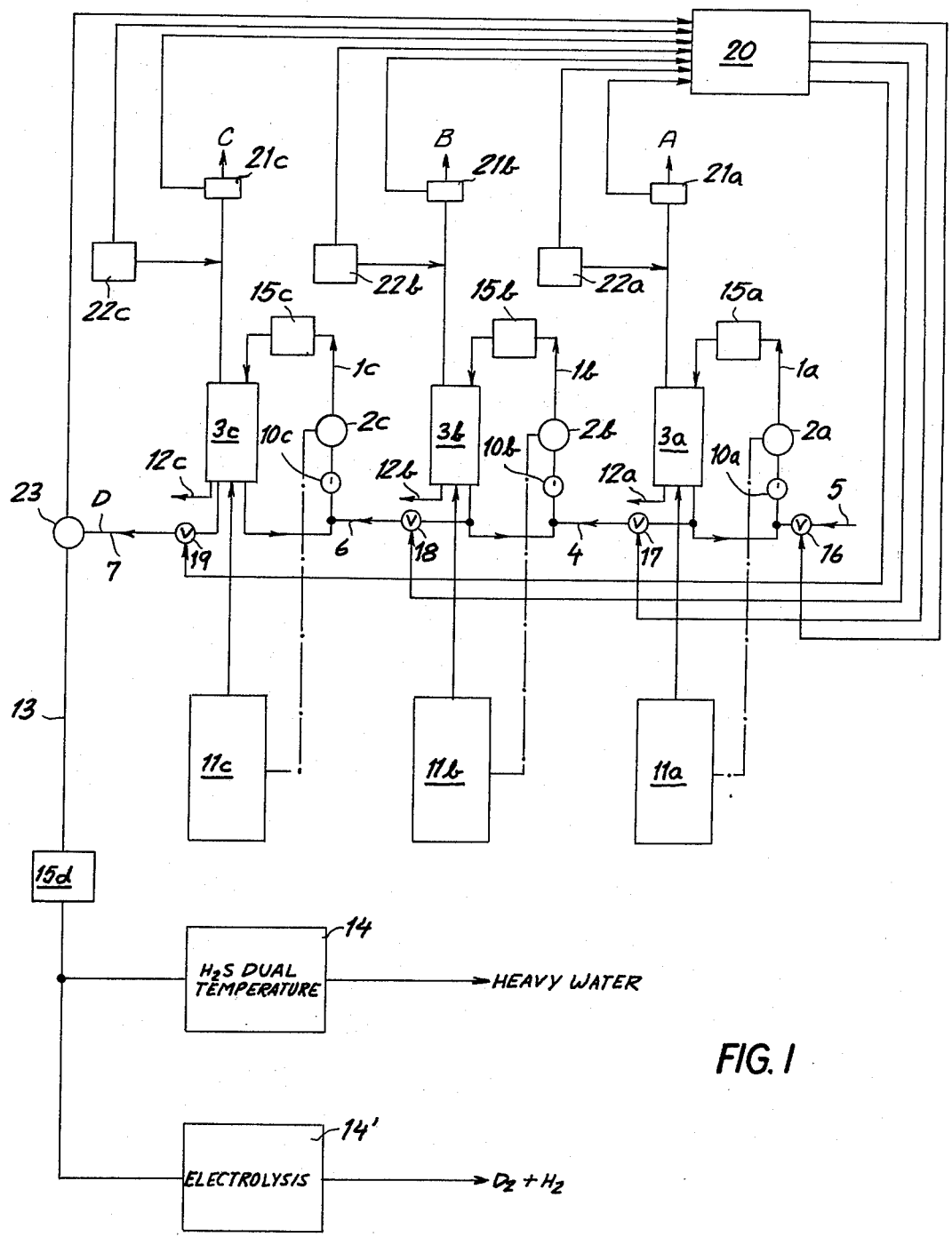
FIG. 1 is a flow diagram illustrating the method of the present invention.

In FIG. 1 of the drawing, I show at $1a$, $1b$ and $1c$ three cooling-water-circulation circuits of the open type mentioned above. Each of the water-circulation systems represented at $1a$, $1b$ and $1c$ comprises a cooling tower $3a$, $3b$ and $3c$ through which water is recirculated via a pump $10a$, $10b$, $10c$ via a condenser or heat exchanger $2a$, $2b$ or $2c$ in which the water is cooled.

While the invention is applicable to a number of industrial processes and is preferably used in conjunction with a power plant as described with reference to FIGS. 2 and 3, its versatility will be demonstrated by the following description of the system of FIG. 1 as part of an elutriation system for the washing of ores and the like as represented at $11a$, $11b$ or $11c$.

The process is also applicable to the removal of solids in the form of sludge from industrial waste gases by counter-current washing in which case elements $11a$, $11b$, $11c$ represent a source of hot gases which are passed upwardly through cooling towers $3a$, $3b$, $3c$ in counterflow to the cooling water which is trickled downwardly to wash solids from the hot gases and cool the latter.

The solids may be recovered as represented at $12a$, $12b$, $12c$ by decantation, filtration or the like. Furthermore, elements $11a$, $11b$, $11c$ may represent any system in which water is recirculated and eventually passes through a cooling tower $3a$, $3b$ or $3c$ which is of the open type described above. In such towers, a portion of the recirculating water passes at all times into the atmosphere as represented by arrows A, B, and C. The system of the invention may thus use the cooling tower $3a$, $3b$ or $3c$ of each cycle to cool the water in heat exchange with the air while heat is trapped through the circulating water at the condenser $2a$, $2b$ or $2c$.

The cooling towers may be of the forced-draft, induced-draft or natural-draft type described at Chapter 15, pages 14 ff, of Perry's Chemical Engineers' Handbook (McGraw-Hill Book Co., New York, 1963).

The system of FIG. 1 operates as follows. A feedwater line 5 delivers fresh water with the usual deuterium-oxide concentration (say 143 parts per million) to the first or upstream cycle $1a$ in an amount equal to the sum of the water losses A + B + C + D where D is the amount of water withdrawn at the last stage of the system as represented at a line 7. In this last stage, especially when the elutriation liquor to be separated from the sludge is present in an amount close to the amount of the solids, ion contamination may be a problem as discussed below.

From the first stage $1a$, a portion of the recirculated water is withdrawn via a line 4, enriched in deuterium by the evaporation process, to supply the second cycle $1b$ with an amount of water equal to the quantity B + C + D according to the downstream losses of water from the system. This lesser quantity of feed water is of a higher deuterium concentration than the original feed water.

Similarly, a line 6 delivers still more highly enriched water to the last stage $1c$ in an amount equal to the sum C + D. The highly enriched water is withdrawn from the system via line 7 at the last stage and after removal of the solids therefrom may be supplied via a line 13 to a heavy-water-recovery plant 14 which may be of the type described in the *Concise Encyclopaedia for Nuclear Energy*, pages 377 ff, Interscience Publishers, New York, 1962. The system may be operated in accordance with the principles of CLUSIUS STARKER whereby the deuterium concentration of hydrogen is increased by fractional distillation and the hydrogen/deuterium mixture, highly enriched in deuterium, is converted to heavy water by reaction with oxygen. The hydrogen and deuterium may be released from the water processed in accordance with the present invention by electrolysis in a unit 14'. In the so-called $H_2S$ process, another system for the concentration of deuterium from water also known as the SPEVAK or dual-temperature-exchange process, two countercurrent tower contactors are used at a relatively low temperature and a relatively high temperature. Hydrogen sulfide flows to each of the towers in turn, in a substantially closed circuit. Feed water is admitted to the top of the cold tower and flows from the bottom thereof to the top of the hot tower. In the hot tower there is a tendency to strip deuterium from water and carry it in the form of HDS to the cold tower whence the deuterium is transferred to the water again, thereby increasing the deuterium concentration of the water.

As illustrated in the drawing, ion-exchange units 15a, 15b, 15c may be provided in each of the recirculation cycles to permit long-term buildup of the deuterium-oxide concentration without a concomitant increase of salt concentration.

A further ion-exchange unit may be connected in line 7 or line 13 to insure removal of ion contaminants prior to the use of the water as a feedstock of the heavy-water plant 14 or at which a gas mixture rich in deuterium (HD or $D_2$) is recovered.

The system illustrated in FIG. 1 is provided with automatic controls using valves 16, 17, 18 and 19 to control the fresh-water input to the first-circuit 1a, the proportion of the first-circuit liquid which is fed to the second-circuit, 1b, the proportion of the second-circuit liquid withdrawn and supplied to the third circuit 1c, and the proportion of the liquid used in the last stage which is delivered to the heavy-water plant 14, respectively. The valves 16 through 19 are controlled by a programmer 20 which is supplied with inputs representing the quantities of water withdrawn from the system. A flow meter 21a, 21b, 21c is provided to measure the output from each stage in terms of the volume rate of the flow of gases from the cooling towers while a humidity or moisture detector 22a, 22b, 22c determines the moisture concentration of these gases. The resulting product is a measure of the amount of water lost from a particular tower and provides an indication of the necessary flow input as feed water from the previous stage or from the fresh water source. A further input is derived from a flow meter 23 in line 7 which serves to indicate the quantity of enriched water withdrawn from the last stage. The programmer 20 is thus able to control the valves 16 through 18 to supply water to each of the circuits 1a through 1c in accordance with the relationships set forth above.

Figure 2:
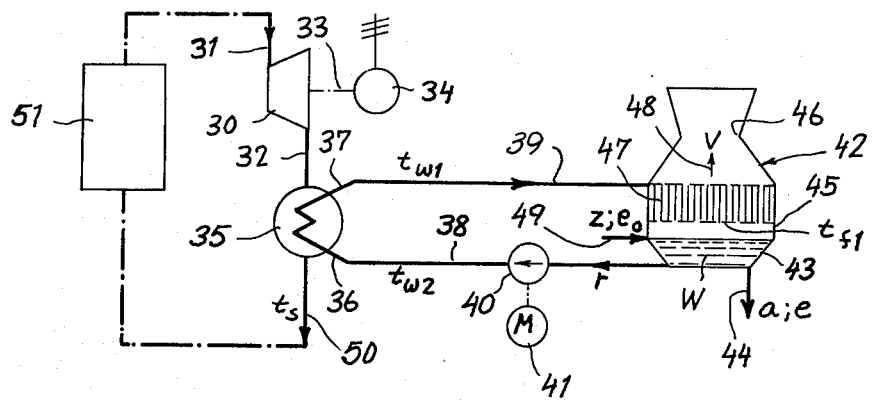
FIG. 2 is a diagram of a power plant using a cooling cycle of the general type shown in FIG. 1 and operating in accordance with the following Specific Example.

In FIG. 2, I have shown a basic unit of an electrical power generating plant according to the present invention, only the portions of the plant which are significant for the purposes of the following Example being described. The generating plant comprises a turbine 30 which may be driven by a high-temperature gas introduced at 31 and led off at 32 as a depleted gas, the major part of the energy of the gas being converted into kinetic energy of the turbine which is connected at 33 to an electrical generator 34.

The waste heat of the depleted primary fluid is recovered in a heat exchanger 35 by heat transfer to a cooling circuit. The temperature of the depleted fluid leaving the waste-heat exchanger 35 is represented as $t_s$, the latter fluid being generally a condensate such as water when the primary fluid is steam.

The heat exchanger 35 has an inlet 36 and an outlet 37 for the coolant which, in the present case, is water in which the deuterium-oxide concentration is to be increased. At the inlet or low-temperature side of the heat exchanger, the water is at a temperature $t_{w2}$ approximately equal to ambient temperature; an elevated temperature of the secondary coolant in the outlet 37 is represented at $t_{w1}$.

The cooling circuit comprises circulation lines 38 and 39, the former including a circulating pump 40 driven by an electric motor 41 whose energy contribution is disregarded for the purposes of the following specific Example because it is small by comparison with the thermal-energy values of the system.

The circuit also includes a cooling tower 42 which is open to the atmosphere and may be of the natural-draft type illustrated. An induced-draft tower may also be used. The tower, shown only schematically, comprises a sump 43 in which the circulating water is cooled, an outlet 44 at which water can be withdrawn from the system as sludge or feed water for a subsequent cooling circuit, inlets 45 for the convected air, and an outlet 46 open to the atmosphere through which the air and evaporated water pass. The water from line 39 is introduced via a distributor 47 in the form of vertical plates or baffles having a high surface area and ensuring contact between the water film and the air. Air is induced to flow upwardly through the tower by the natural draft of air movement across the top of the tower and the convective effect of rising heated air and thus passes in the direction of arrow 48 countercurrent to the direction of movement of the water (downwardly) into the sump. The water is thereby cooled and collected in the latter. The total volume of water in the cooling circuit, circulated through the condenser 35, lines 38 and 39 and the cooling tower 42 is represented at W while the volume of water which is discharged into the atmosphere is represented at $v$. Feed or make-up water is introduced into the tower at 49 at a rate $z$ and with a deuterium content $e$. The water is withdrawn at 44, at a rate $a$ and with a deuterium content $e_0$.

In operation, the high-temperature primary fluid from a heat source such as a nuclear reactor or boiler is injected into the turbine 30 to drive the latter and generate electricity at 34. The depleted fluid, generally steam, traverses the condenser 35 from which it emerges at 50 for return to the heat source of the primary circuit, e.g. a reactor or boiler 51. The waste heat abstracted from the primary fluid is transferred into the secondary coolant at the condenser 35, the coolant traversing the circulating lines 38, 39 at a rate which may be measured in tons (metric) per hour. In the cooling tower 42, this heat is transferred to air by conduction, release of latent heat of vaporization by evaporation of water, etc. The cooling fluid is recirculated to the condenser 35.

Figure 3:
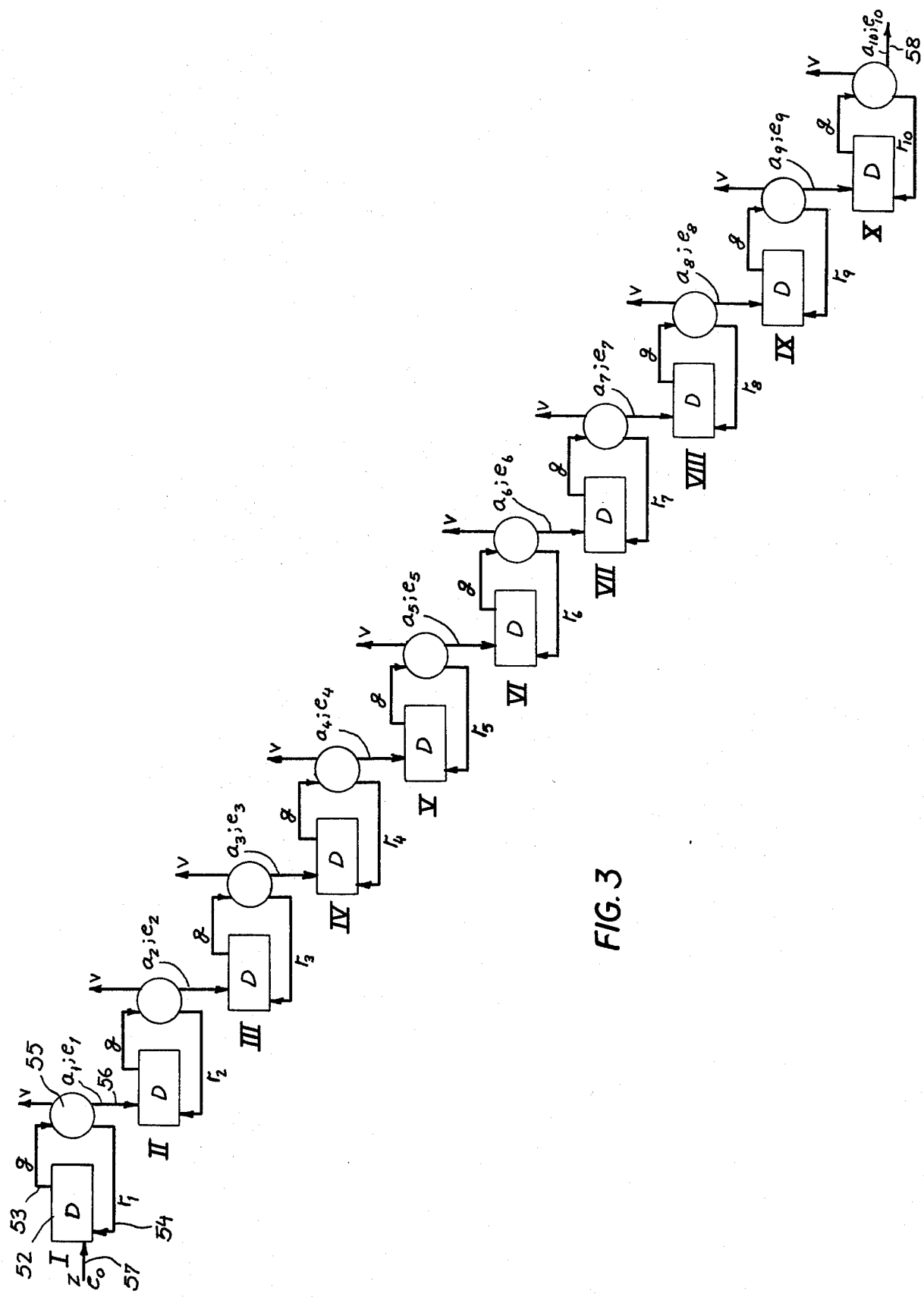
FIG. 3 is a diagram representing a ten-stage cascade according to the present invention.

The cooling system illustrated in FIG. 2 can be viewed in a simplified fashion as a single stage of the replenishment cascade illustrated in FIG. 3. The elements of each part of the replenishment cascade will be described with reference to the initial cooling circuit I and include a mixer 52, representing the sump of the cooling tower, in which make-up water is added at a rate z, from which the circulating stream is drawn at 53 at a rate $g = r + a + v$, and to which the return stream is fed at a rate $r_1$ via a line 54. The evaporating part of the cooling tower is represented at 55 and also receives the circulating stream while discharging into the atmosphere water at a rate $v$.

The water extracted from each stage (besides the lost amount $v$) is represented by $a_i$ where the subscript $i$ represents the number of the stage. Lines 56 connect each preceding circuit with the next to deliver make-up water thereto. All of the make-up water supplied to the system is provided through an inlet 57, the volume of the make-up water being represented by $z$, and all of the water not lost by evaporation or as a residue in a sludge is recovered as deuterium-oxide-enriched water at 58 at the end of the replenishment cascade. In the following specific Example, relating to a system with 10 stages as illustrated in FIG. 3, $e_i$ represents the percentage of deuterium in the water at the output of a respective stage.

SPECIFIC EXAMPLE

The following Example uses a replenishment cascade having 10 stages I . . . X as illustrated in FIG. 3, each of the cooling circuits being part of a power plant using a turbine and generator arrangement as illustrated in FIG. 2. The waste-heat quantity Q in Gcal/hour is transferred to the water at condenser 35 which is heated from the ambient temperature $t_{w2}$ to the elevated temperature $t_{w1}$ at which the evaporator of cooling tower 42 is operated. The quantity of heat Q is released in the cooling tower with evaporation of water at a rate $v$, the cooling air having the initial temperature $t_{f1}$ (wet-bulb thermometer).

The water in the cooling circuit of the first stage has a deuterium content of 0.0143% or 143 parts per million on the average. In the final stage, a sludge resulting from buildup of salts and other contaminants is removed and the water separated therefrom so that the rate of recovery $w$ of enriched water is somewhat less than the final extraction rate $a_n$.

The following table sets out the parameters of the system according to the invention:

Table I

| | |
|---|---|
| Nominal output of individual power plant | $N_i = 300$ MW$_e$ |
| Specific heat consumption of turbine stage | $w_B = 1,960$ kcal/kW hour |
| Waste heat transferred at condenser | $Q = 375$ Gcal/hour |
| Saturation temperature of condensate | $t_s = 38°C$ |
| Outlet temperature of secondary coolant | $t_{w1} = 34°C$ |
| Inlet temperature of secondary coolant | $t_{w2} = 21.6°C$ |
| Air temperature (wet-bulb thermometer) | $t_{f1} = 8°C$ |
| Condenser efficiency | $\Delta t_k = t_s - t_{w1} = 4°C$ |
| Temperature spread | $t_{w1} - t_{w2} = 12.4°C$ |
| Cooling limit | $t_{w2} - t_{f1} = 13.6°C$ |
| Relative humidity of the air | 77% |
| Evaporation rate | $v = 450$ t/h |
| Cooling-water circulation rate | $g = 30 \times 10^3$ t/h |
| Useful-water recovery | $w = 150$ t/h |
| Total water per cooling cycle | $W = 12 \times 10^3$ tons |
| Natural concentration of deuterium (average) | $e_0 = 0.0143\%$ |
| partial-pressure ratio | $P_P = \dfrac{P_{H_2O}}{P_{HDO}}$ at $28°C = 1.07$ |

The cooling tower is a natural-draft HAMON tower operating on the counterflow principle with a sump and tower shell of reinforced concrete. The trickle plates are composed of asbestos cement, are separated by synthetic-resin spacers and are disposed below an asbestos-cement water-distributing baffle. The water is sprayed from nozzles of synthetic resin. The tower has the following dimensions:

| | |
|---|---|
| Diameter at base line | 75 m |
| Area | 4,400 m² |
| Depth of reservoir | 2.70 m |
| Minimum diameter of shell | 42.5 m |
| Diameter at upper edge of cooling tower | 48.5 m |
| Total height above sump | 103 m. |

The results at each of the stages, for a system of the type described wherein the supply rate $z$ of make-up water for the entire system is about 4,700 t/h, is given in the following table:

TABLE II

| stage | Recirculated water: $r_i$ t/h | Withdrawn water: $a_i$ t/h | Deuterium Concentration: $e_i$ % |
|---|---|---|---|
| 1 | 25,300 | 4,250 | 0.01439 |
| 2 | 25,750 | 3,800 | 0.01449 |
| 3 | 26,200 | 3,350 | 0.01460 |
| 4 | 26,650 | 2,900 | 0.01473 |
| 5 | 27,100 | 2,450 | 0.01488 |
| 6 | 27,550 | 2,000 | 0.01506 |
| 7 | 28,000 | 1,550 | 0.01529 |
| 8 | 28,450 | 1,100 | 0.01559 |
| 9 | 28,900 | 650 | 0.01601 |
| 10 | 29,350 | 200 | 0.01677 |

The withdrawal rate $a_i$ deminishes from stage to stage by a constant amount of 450 tons per hour, corresponding to the loss rate $v$. This accounts for a circulation rate $g$ of 30,000 tons per hour according to Table I.

Figure 4:
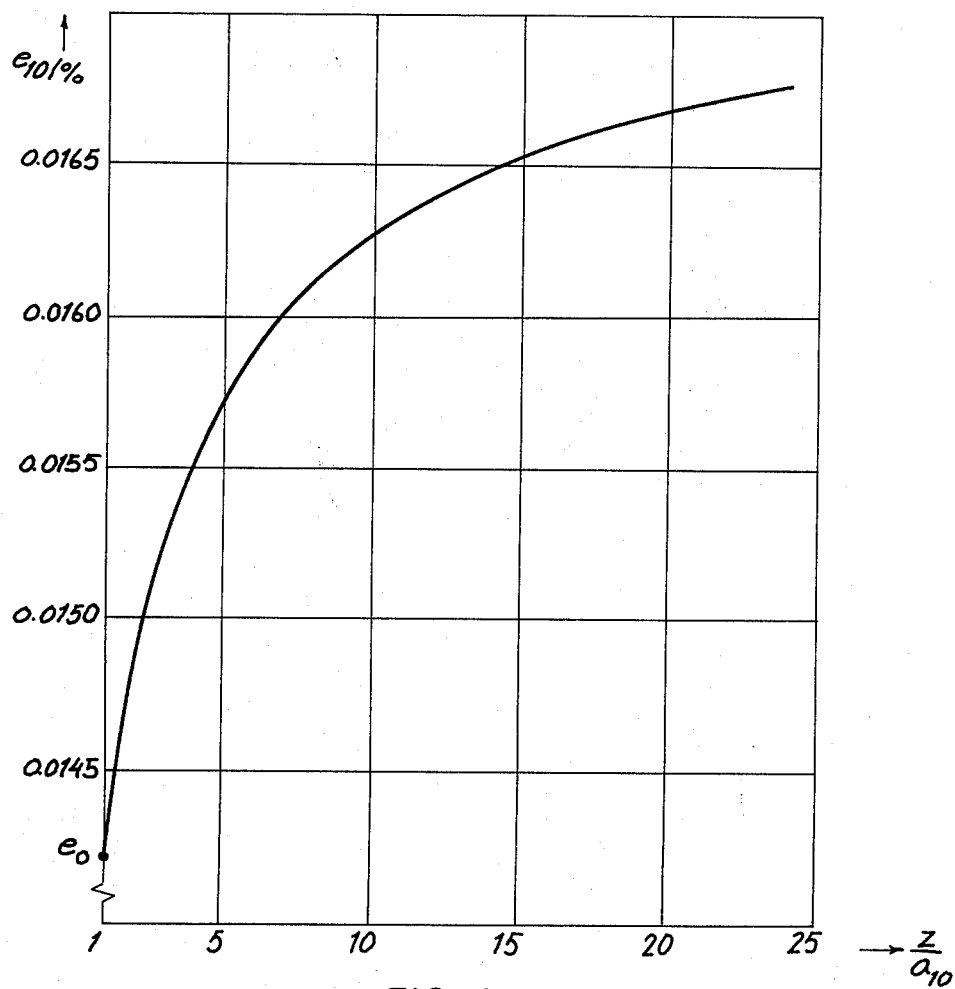
FIG. 4 is a graph illustrating the specific Example.

The extent of the concentration is represented by $e = z/a_{10} = 23.5$ where $a_{10} = 200$ t/h and $z = 4,700$ t/h as noted. It will thus be apparent that 200 t/h of deuterium-enriched water is withdrawn with the deuterium content increased from 143 parts per million to 167.7 parts per million or by about 17%. When the rate of withdrawal $a_{10}$ of water from the system is varied, the extent of enrichment for 10 stages is as shown in FIG. 4, it being understood that the supply rate $z$ for the total make-up water must also be varied correspondingly.

When one supplies deuterium-enriched water at a concentration of about 0.0167% for the recovery of heavy water by the $H_2S/H_2O$ process, 1 ton of $D_2O$ corresponds to 35,000 tons of water as opposed to 41,000 tons of water with the natural concentration of 0.0143%. Under the formula taught by COHEN for calculating the cost of heavy-water production, for each part per million of increased concentration of the deuterium in the supply water, the cost of producing $D_2O$ drops by $0.1 per pound. With the increase of 25 ppm obtained as described above, it is possible to reduce the cost of $D_2O$ production by more than $5 per kg. At a heavy-water cost of $65 per kilogram, this corresponds to a reduction of about 8%.

I claim:

1. A method of increasing the concentration of heavy water in natural water, comprising the steps of:

circulating a flow of natural water through a cascade of treatment stages, each treatment stage comprising a steam turbine, a cooling circuit, a condenser, and an open-air cooling tower;

alternately elevating the temperature of said natural water in each treatment stage by indirect heat exchange with the exhaust steam of said turbine in said condenser and lowering the water temperature by exposure thereof to approximately ambient temperature in said open-air cooling tower whereby a fraction of the water evaporates in each treatment stage;

continuously transferring a portion of the cooled water from one cooling circuit to another in a predetermined cascade, at a rate exceeding the evaporation losses of all succeeding cooling circuits of the cascade, with progressive enrichment of the circulating water in its heavy-water content from one cooling circuit to the next;

continuously supplying fresh water to the first cooling circuit of the cascade at a rate balancing the evaporation thereof and the portion transferred therefrom to the next-following cooling circuit; and continuously withdrawing part of the cooled water of the last cooling circuit in the cascade with an increased concentration of heavy water, the withdrawn part representing an excess of the supplied water over the combined evaporation losses of all cooling circuits.

2. A method as defined in claim 1 wherein the rate of withdrawal of water from the last cooling circuit is substantially smaller than the evaporation rate thereof.

3. A method as defined in claim 2 wherein the volumes of circulating water in all cooling circuits are substantially equal, the evaporation rate being about the same for each cooling circuit.

* * * * *